United States Patent [19]

Nishiwaki

[11] Patent Number: 4,762,446
[45] Date of Patent: Aug. 9, 1988

[54] CUTTER OF TIP DRESSER FOR WELDING APPARATUS
[75] Inventor: Toshihiro Nishiwaki, Kawasaki, Japan
[73] Assignee: Obara Corporation, Tokyo, Japan
[21] Appl. No.: 884,586
[22] Filed: Jul. 11, 1986
[30] Foreign Application Priority Data
Jan. 24, 1986 [JP] Japan .................. 61-007773[U]
[51] Int. Cl.⁴ .............................................. B23B 51/00
[52] U.S. Cl. ................................ 408/203.5; 407/62; 407/30; 407/42; 144/30; 82/4 C; 408/211
[58] Field of Search .............. 82/4 C; 30/263, 264, 30/265, 347, 494, 495; 144/30; 408/203.5, 207, 211; 407/30, 33, 42, 54, 62

[56] References Cited
U.S. PATENT DOCUMENTS 2,284,483  5/1942  Whitesell ........................ 408/211
2,418,767  4/1947  Hall ................................. 407/33
2,980,986  4/1961  Gryglas ........................ 408/203.5
3,820,437  1/1974  Dyer et al. .
4,101,240  7/1978  Fox ................................. 408/211
4,362,446  12/1982  Bell ................................ 408/211

FOREIGN PATENT DOCUMENTS
57-54946  11/1982  Japan .

Primary Examiner—Frederick R. Schmidt
Assistant Examiner—Lawrence Cruz
Attorney, Agent, or Firm—Flynn, Thiel, Boutell & Tanis

[57] ABSTRACT

A cutter of a tip dresser for welding gun has three blades, one of which is extended to a central position of the cutter and includes a flat portion and an upstanding portion. A cutting edge is formed on the flat portion reaching from the central position to the upstanding portion. With such arrangement of the cutter, the tip is satisfactorily cut by the cutting edge even in the vicinity of the central position where its circumferential speed is slow.

4 Claims, 1 Drawing Sheet

CUTTER OF TIP DRESSER FOR WELDING APPARATUS

BACKGROUND OF THE INVENTION

1. FIELD OF THE INVENTION

The present invention relates to a cutter of a tip dresser for use in dressing a tip or electrode of a welding apparatus.

2. DESCRIPTION OF THE PRIOR ART

A dresser is known up to now, which employs two or three blades as a cutter for dressing a tip of a welding apparatus. Such a dresser is disclosed for example in Japanese Laid-Open Utility Model Publication No. 54946/82, wherein, as shown in FIGS. 4 and 5 herein, the dresser employs a double-edged cutter comprising a flat portion 3 having blades 1 constituting the cutter each with a pointed tip centered at a central point 2 as well as an upstanding portion 4 rising outwardly of the flat portion 3, thereby forming a cutter end which is dish-shaped in cross section.

The prior three piece blade structure has as described above the pointed tips of the respective blades 1 centered at the central point 2. Accordingly, each of the blades can have a front relief angle formed thereon upon forming the cutting blade, but not a rake angle characterizing the cutting blade in the vicinity of the central point. Thus, the cutting capability of the cutter near its flat portion 3, particularly in the vicinity of the central position point 2 thereof is extremely reduced. Namely, the flat surface of the pointed end of the electrode or tip can not be cut uniformly, particularly in its central portion, 50 the pointed end can not be cut as desired. As a result, a desired shape of the tip can not be achieved.

SUMMARY OF THE INVENTION

In view of the drawbacks with the prior cutter described above, it is an object of the present invention to provide a cutter for a tip dresser wherein one of the three blades as arranged in angular intervals of 120° is extended to the central position of the cutter to form a flat portion and an upstanding portion, as well as to form a cutting edge formed on the flat portion extending from the central position to the upstanding portion.

According to the present invention, with a tip to be dressed being brought into pressure contact with one side of a double-edged cutter, and then with the cutter being rotated, the tip is cut in accordance with the shape of a cutter blade. Hereupon, one of the three blades is adapted to extend to a central position of the cutter to form a flat portion and an upstanding portion, and a cutter edge is formed on the flat portion reaching from the central position to the upstanding portion. Accordingly, the tip is satisfactorily cut by the cutting edge formed on the blade even in the vicinity of the central point its circumferential speed is slowed down, and thus it can be dressed into a desired shape as a whole.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
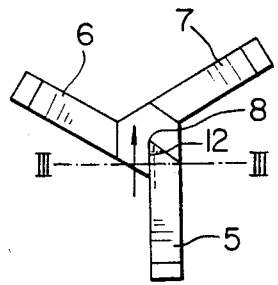
FIG. 1 is a plan view of an embodiment of a cutter of a tip dresser for welding gun according to the present invention.
Figure 2:
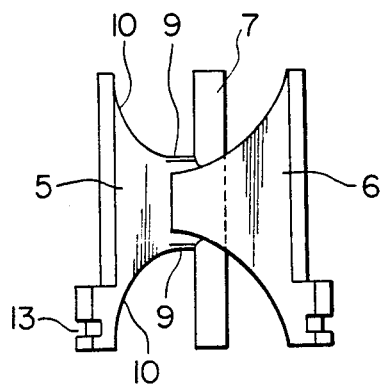
FIG. 2 is a side elevational view of the same.
Figure 3:
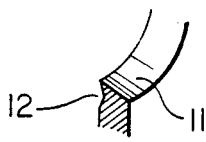
FIG. 3 is a cross sectional view of the embodiment of FIG. 1 along a line III—III.
Figure 4:
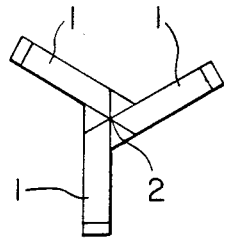
FIG. 4 is a plan view of a prior cutter.
Figure 5:
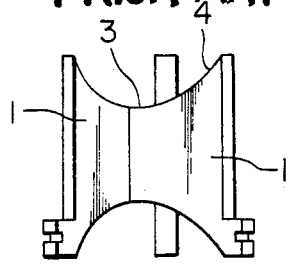
FIG. 5 is a side elevational view of the prior cutter of FIG. 4.

An embodiment of a cutter of a tip dresser for a welding tip according to the present invention will be described with reference to FIGS. 1 and 3.

In the same figures, designated at 5, 6, and 7 are respectively blades which are integrally formed with each other. A pointed inner end of one blade 5 is extended to a central point 8 of the cutter, which point 8 corresponds to the longitudinal axis of the cutter, and the extended portion forms a flat portion 9, from which an upstanding portion 10 is formed.

The other blades 6, 7 have not the inwardly extended central portion and terminate in inner ends which are spaced outwardly away from the central point. Accordingly, the inner ends of the cutting edges defined on the respective blades 5, 6, and 7 are independent of and spaced from each other.

Therefore, each of the blades 5, 6, and 7 not only has a front relief angle 11, but the flat central portion 9 of the blade 5 has a rake angle 12 thereon. Namely, since the blades 5 and 6 have a gap therebetween, the rake angle groove 12 can be formed with ease over the front face of the whole flat portion 9 by processing the same portion with a cutting tool through this portion as shown by arrow (a).

Furthermore, a recess 13 is formed outwardly at one end of the respective blades 5, 6, 7 for mounting the cutter on a cutter holder.

Since in such a manner the cutting edge 14 is formed over the whole flat portion 9 of the blade 5, with the tip to be dressed being brought into close contact with the one end of the cutter and rotated, the welding tip is cut in response to the shape of the cutter blades. Hereupon, the blade 5 is extended to the central position of the cutter to form the flat portion and the upstanding portion, and has the cutting edge 14 formed over the flat portion 9 reaching from the central position 8 to the upstanding portion 10. Accordingly, the welding tip is satisfactorily cut by the cutting edges formed on the blades even in the vicinity of the central position where its circumferential speed is extremely slowed down, and thereby it is dressed into a desired shape.

With the cutter according to the present invention, one of the blades constituting the cutter is extended to the central portion of the cutter, and a cutting edge is formed over the whole flat portion extended as described above. Accordingly, the welding tip is sufficiently cut by the cutting edge formed on the blades even in the vicinity of the central position where its circumferential speed is extremely slowed down, and thus the tip is dressed into a desired shape as a whole.

In addition, the cutting blade can not only be formed with ease, but it can be simply sharpened.

Although a certain preferred embodiment has been shown and described, it should be understood that many changes and modifications may be made therein without departing from the scope of the appended claims.

What is claimed is:

1. A cutter of a tip dresser for a welding apparatus, comprising:

a plurality of at least three blade members arranged so as to project generally radially outwardly from a central longitudinal axis of the cutter, said blade members being substantially uniformly angularly spaced around the axis and cooperating to define a dish-shaped recess on one end of the cutter for receiving a tip therein;

one said blade member having a radially inner flat portion which projects inwardly substantially to said central axis, said radially inner flat portion being joined to a radially outer portion which extends axially outwardly as it projects radially outwardly, said one blade member having a cutting edge formed thereon which extends from said radially outward portion along said flat portion substantially to said central axis, said cutting edge defining the profile of said tip-receiving recess; and the remaining blade members of said plurality having cutting edges thereon which terminate radially outwardly a substantial distance from said central axis, each of said remaining blade members having a radially outer portion corresponding substantially to the radially outer portion of said one blade member, said remaining blade members being free of radially inner flat portions so as to not interfere with the cutting function performed by the cutting edge which extends along the radially inner flat portion of said one blade member.

2. A cutter according to claim 1, wherein the radially inner flat portion of said one blade member has a rake angle groove formed in a front face of said radially inner flat portion directly adjacent the cutting edge formed thereon, said rake angle groove extending inwardly along said radially inner flat portion substantially to said central axis.

3. A cutter according to claim 2, wherein said cutter has a said dish-shaped recess formed in opposite ends thereof, said plurality of blade members having similar structures at opposite axial ends thereof for defining said recesses.

4. A cutter according to claim 1, wherein said blade members are spaced at angular intervals of about 120°.

* * * * *